United States Patent
Sun et al.

(10) Patent No.: US 8,611,539 B2
(45) Date of Patent: *Dec. 17, 2013

(54) GROUP KEY SECURITY IN A MULTIHOP RELAY WIRELESS NETWORK

(71) Applicant: Apple Inc., Cupertino, CA (US)

(72) Inventors: Sheng Sun, Kanata (CA); Guo Qiang Wang, Kanata (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/663,835

(22) Filed: Oct. 30, 2012

(65) Prior Publication Data

US 2013/0052996 A1 Feb. 28, 2013

Related U.S. Application Data

(63) Continuation of application No. 12/220,029, filed on Jul. 21, 2008, now Pat. No. 8,325,922.

(60) Provisional application No. 60/950,897, filed on Jul. 20, 2007.

(51) Int. Cl.
*H04K 1/00* (2006.01)
*H04L 9/00* (2006.01)

(52) U.S. Cl.
USPC .......................................... 380/270; 380/277

(58) Field of Classification Search
USPC .................................................. 380/270, 277
See application file for complete search history.

(56) References Cited

U.S. PATENT DOCUMENTS

| | | | |
|---|---|---|---|
| 7,602,918 B2 | 10/2009 | Mizikovsky et al. | |
| 7,639,712 B2 | 12/2009 | Un et al. | |
| 7,650,500 B2 | 1/2010 | Matoba | |
| 7,904,945 B2 | 3/2011 | Zheng | |
| 7,925,021 B2 | 4/2011 | Un et al. | |
| 8,107,629 B2 | 1/2012 | Ryu et al. | |
| 8,175,272 B2 | 5/2012 | Braskich et al. | |
| 2004/0025018 A1 | 2/2004 | Haas et al. | |
| 2006/0149967 A1 | 7/2006 | Lee et al. | |
| 2009/0074189 A1* | 3/2009 | Ryu et al. | 380/277 |

OTHER PUBLICATIONS

"Authentication of Management Messages in a Relay System," IEEE 802.16 Broadband Wireless Access Working Group, Jul. 16, 2007.*

(Continued)

*Primary Examiner* — Carl Colin
*Assistant Examiner* — S. Ali Zaidi
(74) *Attorney, Agent, or Firm* — Meyertons, Hood, Kivlin, Kowert & Goetzel, P.C.

(57) ABSTRACT

A security zone key is used to secure data traffic/control messages in a multi-hop wireless relay network. In one embodiment, the security zone key is generated by a base station and passed to relay stations and optionally mobile stations that are to be associated with the security zone. A given base station may implement multiple security zones on the wireless network. The members in each zone share a unique group security association. One or more connections may be assigned to a particular security zone. Data traffic/control messages directed to relay stations in a security zone are processed using the security zone key to enable all relay nodes within the security zone to verify the authenticity of the management message and optionally decode the messages. From a management perspective, since a common security zone key is in use by all relay stations in the security zone, the management messages may be broadcast/multicast to the relay nodes in the security zone and the key distribution and management protocols have much less complexity.

15 Claims, 6 Drawing Sheets

(56) References Cited

OTHER PUBLICATIONS

Okuda et al. "TEK Transfer in Relay Systems;" IEEE 802.16 Broadband Wireless Access Working Group, IEEE C802.16j-07/149rl, Mar. 5, 2007; pp. 1-4.

Comstock et al. "An asymmetric security mechanism used in security zone;" IEEE 802.16 Broadband Wireless Access Working Group, IEEE C802.16j-07/378, Jul. 5, 2007; pp. 1-5.

Seleznev, Sergey. "Authentication of management messages in a relay system;" IEEE 802.16 Broadband Wireless Access Working Group, IEEE C802.16j -07/384, Jul. 5, 2007, pp. 1-6.

Tao et al. "Aggregation and Concatenation in IEEE 802.16j Mobile Multihop Relay (MMR) Networks:" IEEE Mobile WiMAX Symposium 200, Apr. 19, 2007, pp. 85-90.

* cited by examiner

→ Uplink Access Link
← Downlink Access Link
- - -→ Uplink Relay Link
◄ - - Downlink Relay Link

GROUP KEY SECURITY IN A MULTIHOP RELAY WIRELESS NETWORK

CROSS-REFERENCE TO RELATED APPLICATIONS

This application is a continuation of U.S. application Ser. No. 12/220,029, filed on Jul. 21, 2008, which claims priority to U.S. Provisional Patent Application No. 60/950,897 filed Jul. 20, 2007, entitled GROUP KEY DISTRIBUTION WITHIN SECURITY ZONE FOR .16J RELAY NETWORK, both of which are hereby incorporated herein by reference as if fully and completely set forth herein.

BACKGROUND

Communication networks include a plurality of network elements interconnected by links. The nodes use the links to forward data to one another to allow data to travel across the network. The links may be wired links formed using optical fibers or wires, or may be wireless links implemented using an appropriate wireless transmission protocol.

Conventionally, wireless networks include a base station connected to a wired network such as a backbone network. The base station transmits wireless signals to mobile stations within its area of coverage to enable mobile stations to have access to the higher bandwidth communication resources offered by the backbone network. For example, a cellular base station may transmit and receive signals from cellular telephones within a particular geographic area associated with a cellular tower. Many wireless standards have been developed, both for telephony and data, to implement wireless networks of this nature, and it is likely that additional developments will continue to be made in the area of wireless networking.

As wireless networks have developed, the point to point paradigm, in which a base station communicates directly with a set of mobile stations, has been supplemented to enable relay stations to be interposed between the base station and mobile station. In a network of this nature, the base station transmits signals intended to reach the mobile station. Rather than transmitting the signals directly to the mobile station, however, an intervening relay station may intercept the wireless signals and forward them on toward the mobile station. One or more such relay stations may thus help transmit data from the base station to the mobile station and, in the reverse direction, from the mobile station to the base station.

Introducing relay stations into the wireless network not only increases the size of the geographic area but also enhances the capacity throughput that may be serviced by a base station, which is desirable from a network deployment standpoint. However, it also introduces additional security concerns since the signals are now being intercepted and relayed on the network by other network elements. Additionally, since the signals are being transmitted wirelessly, they are subject to interception by rogue network elements. Particularly where the relay stations are deployed in an ad-hoc manner, and may be moving between base stations, security on the network may become an important issue. For example, the introduction of relay nodes makes the network vulnerable to replay attacks and interception attacks.

One emerging wireless communication standard is being defined by the Institute of Electrical and Electronics Engineers (IEEE) as standard 802.16. 802.16 is also commonly referred to as WiMax. The WiMax family of standards provides minimal security for control plane messages. Standard 802.16e-2005 provides security protection on the access link, between the mobile station and the first relay node. While similar link-based security could also be implemented on the relay links, between the relay stations and between the relay station and the base station, the link by link security may not be optimum in satisfying delay sensitive applications, i.e VoIP.

For example, doing so would introduce additional overhead processing for each of the relay stations and the control complexity of key distribution and management for each base station. Specifically, if a separate security association were to be established between each pair of relay stations and between each relay station and base station, a given data traffic/control messages would need to be encrypted and decrypted multiple times (using each security association) as it progressed through the network. In addition to incurring additional overhead, this would make broadcasting and multicasting data traffic/control messages difficult to implement. Specifically, since each link would have a separate security association, the data traffic/control messages would need to be encrypted separately for each link and then unicast over the links rather than broadcast over the links. Thus, to process a given management message, a relay station would need to decrypt the message or otherwise process the data traffic/control messages to determine its authenticity, and then re-encrypt the message multiple times to forward the message to its peer relay stations on the several wireless links. The second example is when base station is responsible for key distribution and refreshment, the processing complexity is a function of total number of the relay links in its authentication domain because of the base station has to distribute the keys for each of peering links (and the adjacent nodes) with different security associations.

From a network management perspective, as relay stations are allowed to move within the network and associate with different base stations, the base stations need to be able to transmit management messages to the relay stations in a secure manner. Since the nodes are moving and the topology is changing, the network is vulnerable to replay attacks and interception attacks. Accordingly, it would be desirable to provide a way to provide security to the management messages, as well as data messages, in a multi-hop relay wireless network, while minimizing the amount of processing overhead and enabling multicast/broadcast messages to be used in the management plane.

SUMMARY

A security zone key is used to secure data traffic/control messages in a multi-hop wireless relay network. In one embodiment, the security zone key is generated by a base station and passed to relay stations and optionally mobile stations that are to be associated with the security zone. A given base station may implement multiple security zones on the wireless network. The members in each zone share a unique group security association. One or more connections may be assigned to a particular security zone. Data traffic/control messages directed to relay stations in a security zone are processed using the security zone key to enable all relay nodes within the security zone to verify the authenticity of the management message and optionally decode the messages. From a management perspective, since a common security zone key is in use by all relay stations in the security zone, the management messages may be broadcast/multicast to the relay nodes in the security zone and the key distribution and management protocols have much less complexity.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
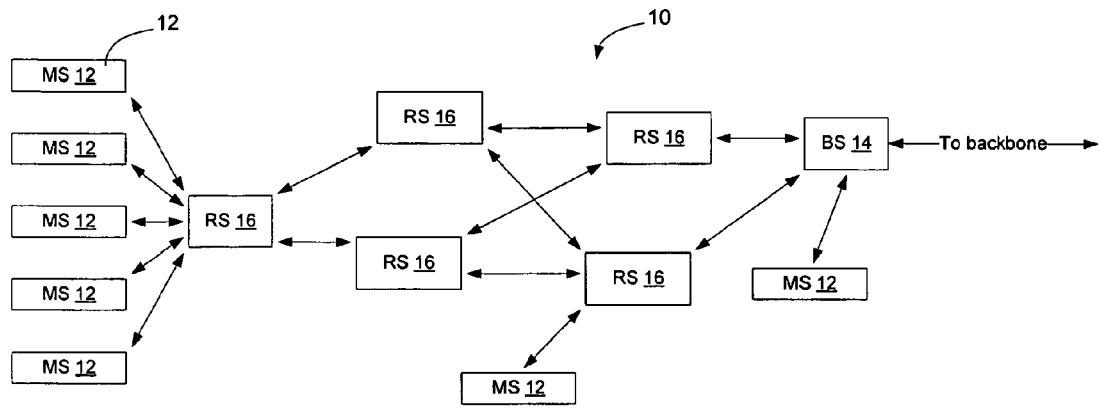
FIG. 1 is a functional block diagram of an example multi-hop relay wireless network.

FIG. 1 is a functional block diagram of an example multi-hop relay wireless network 10. As shown in FIG. 1, in a multi-hop relay wireless network, mobile stations 12 transmit data and receive data from a base station 14. Messages that flow between the mobile station and base station will be referred to as data messages. In the figures, a data message will be indicated using the letter M. An encrypted data message will be shown as {M} followed by a key. For example, the notation {M} TEK indicates that data message M has been encrypted by Transport Encryption Key (TEK). Similarly, management messages will follow the same convention, but the messages will be shown using the letter C. The base station is connected to the backbone or other higher bandwidth network resources, so that the mobile stations can communicate with other devices connected to the network that are not serviced by the same base station.

In a multi-hop relay wireless network, some of the mobile stations 12 may be within range of the base station 14 and thus able to communicate with the base station directly. However, other mobile stations may be too geographically remote from the base station to transmit/receive sufficiently strong signals to enable them to communicate with the base station directly. To extend the geographic coverage of the base station, one or more relay stations 16 may be used to pass signals from the mobile station to the base station and vice versa.

The relay stations may be fixed or mobile, planned or deployed in an ad-hoc manner, and may be dedicated relay stations or mobile stations that are configured to also relay traffic for other mobile stations. Accordingly, the relay network may be constantly changing and may evolve over time according to the availability of the relay stations. The use of relay stations in an 802.16 network is defined in IEEE standard 802.16j—*Air Interface for Fixed and Mobile Broadband Wireless Access Systems—Multihop Relay Specification*", the content of which is hereby incorporated herein by reference. Other standards within the 802.16 family of protocols define other aspects of how the network operates.

Figure 2:
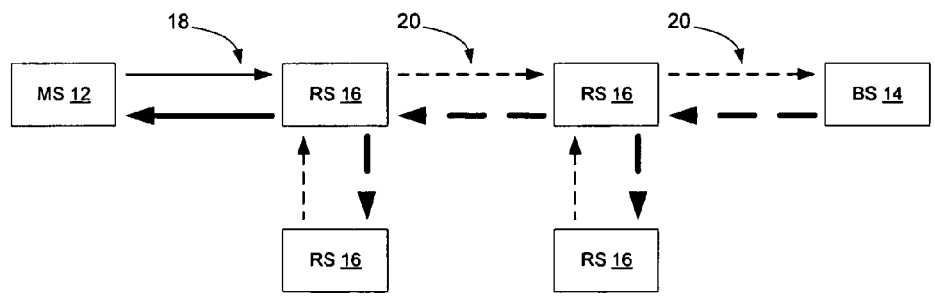
FIG. 2 is a functional block diagram illustrating a portion of the multi-hop relay wireless network of FIG. 1 in greater detail.

FIG. 2 shows a portion of the multi-hop relay wireless network of FIG. 1 in greater detail. In the figures, as shown in FIG. 2, the mobile station will associate with a relay station. The link between the mobile station and the relay station will be referred to as an "access link" 18. The relay station will forward traffic from the mobile station to other relay stations or to the base station. These links 20 between two relay stations, and between the relay stations and the base station, will be referred to as "relay links". The text will use a convention in which a link that carries traffic from the mobile station toward the base station will be referred to as an "uplink." Conversely, a link that carries traffic from the base station toward the mobile station is referred to as a "downlink."

Figure 3:
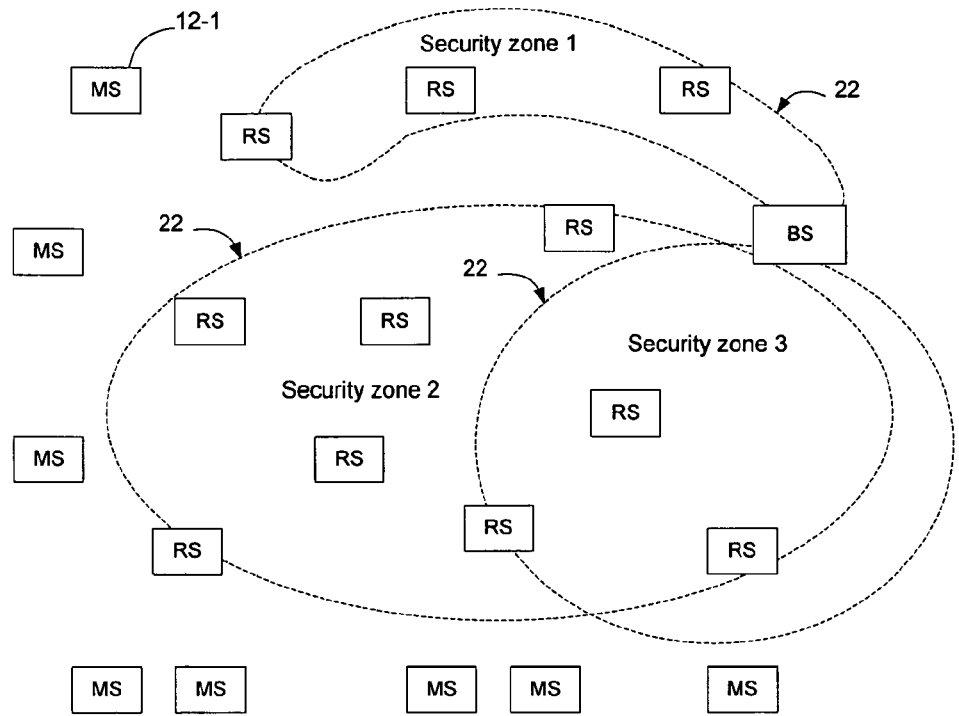
FIG. 3 is a functional block diagram of an example multi-hop relay wireless network showing the creation of security zones within the network according to an embodiment of the invention.

FIG. 3 is a functional block diagram of an example multi-hop relay wireless network showing the creation of security zones within the network according to an embodiment of the invention. As shown in FIG. 3, a security zone 22 may be defined as a collection of two or more relay stations that implement a common security context for the protection of relay management traffic. The base station and a group of relay stations in a security zone maintain a set of trusted relationships, to enable those network elements to satisfy requirements of multi-hop relay system operation.

Figure 8:
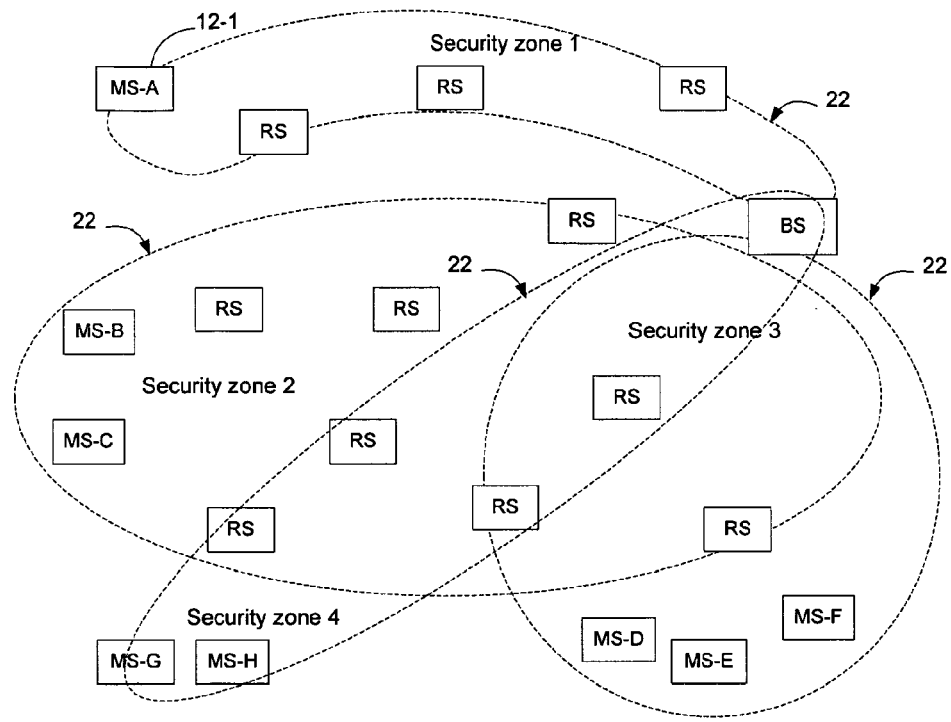
FIG. 8 is a functional block diagram of an example multi-hop relay wireless network showing the creation of security zones within the network that also include mobile stations according to another embodiment of the invention.

FIG. 8 shows another example of a multi-hop relay wireless network in which the security zones not only encompass the base station and one or more relay stations, but also include one or more mobile stations. By including mobile stations in the security zone, messages intended to be received by both the relay station and mobile station may be encrypted using the same security zone key. Since the term "security zone" implies more than three or more zone members having a common security association, where mobile stations are allowed to be included in a security zone, a zone may be formed to include a mobile station, one or more relay stations, and a base station. Where the security zone does not include a mobile station, the security zone would include the base station and at least two relay stations.

As shown in FIG. 3, security zones may be defined in many different ways, and multiple security zones may exist simultaneously on a given multi-hop relay wireless networks. Similarly, security zones that do not include mobile stations may exist on the same network at at the same time as security zones that do include mobile stations. In the example shown in FIG. 3, security zone 1 has been created to provide a security zone associated with the path from the base station to a relay station servicing mobile station 12-1. Similarly, in FIG. 8, security zone-1 has been defined to include the same set of relay stations and to also include the mobile station.

In FIG. 3, other security zones have been drawn. For example, a second security zone has been created to enable management messages to be flooded to a majority of the relay stations on the network, while a third security zone has been created to enable management messages to be flooded to a smaller subset of the relay stations on the network. Similar zones are shown in FIG. 8, but which also include one or more mobile stations. Many ways of defining security zones may be used, depending on the preferences of the network operator.

All zone members within security zone maintain trusted relations, i.e. share common security context for the protection of relay management/data traffic. As noted above, relay stations may move within the network. When a relay station completes successful authentication to the network, it becomes eligible to join one or more security zones. If the base station would like to include the relay station in a security zone, it will deliver security zone key material to the relay station. PKMv2 may be used to securely deliver the key material to the relay station. The relay station will become a member of the security zone after the security zone key material has been provided to the relay station by the base station. Similarly, where a mobile station seeks to join a zone, the security zone key may be securely delivered to the mobile station.

If the relay station or mobile station moves out of a security zone, such that it is no longer associated with a base station, the zone member should not be able to rejoin the security zone without re-authenticating with the base station and obtaining new security zone key material. Stated another way, the zone member should not have knowledge of keys that are used in a particular security zone before joining the security zone, and should delete the key material after leaving the security zone. This may require the security zone keys to be refreshed whenever a zone member leaves a security zone.

The security zone key material includes a security zone key and a key hierarchy that may be used to satisfy security requirements within the security zone, to enable MAC layer management messages to be transmitted with integrity and optionally in an encrypted manner within the defined security zone. The security zone key may also be used to encrypt data messages within the zone.

The security zone key is randomly generated by the base station and transferred to the relay station using a Key Encryption Key (KEK) or Security Zone Key Encryption Key (SZKEK) e.g. in a multicast update. Key exchange within the security zone may be implemented, for example, using Privacy Key Management (PKMv2). The security zone key may be formed by the base station using the base station's random number generator. The security zone key will be used to sign relay management messages and data messages within the security zone, and optionally to encrypt the same messages.

A security zone Security Association (SA) is a group security association which contains keying material to secure relay control within a security zone. The primary keying material associated with a security zone is a Security Zone Key (SZK) and a Security Zone Key Encryption Key (SZKEK). The security zone key is a 160 or 128-bit encryption key that serves as a root for keys that will be used to implement Hash Message Authentication Code (HMAC) and/or Cipher-based Message Authentication Code (CMAC) processes. The Security Zone Key Encryption Key (SZKEK) is a 128 bit encryption key that serves the same function as Security Association Key Encryption Key (SA KEK) but for group security association.

Both the security zone key and the security zone key encryption key are provisioned by the base station. Members of a security zone are considered trusted and share a common security zone key. The security zone key encryption key may also be common within security zone. The Security Association Identifier (SAID) is unique at a base station and all relay stations within a defined security zone.

Table 1 shows the Security Zone Key context, and includes parameters associated with the security zone key.

TABLE 1

Security Zone Key Context

| Parameter | Size (bits) | Usage |
|---|---|---|
| SZK | 160 | Randomly generated by the base station and transmitted to relay station under KEK or SZKEK (in multicast update). |
| SZK SN | 4 | The sequence number of security zone key. The new security zone key sequence number shall be one greater than the preceding security zone key sequence number. |
| HMAC_KEY_SZU or CMAC_KEY_SZU | 160 or 128 | The key which is used for signing uplink management messages. |
| HMAC_PN_SZU, CMAC_PN_SZU, HMAC_PN_RLU or CMAC_PN_PLU | 32 | Used to avoid uplink replay attack on the management connection - when this expires a new security zone key shall be distributed by the base station. |
| HMAC_KEY_SZD or CMAC_KEY_SZD | 160 or 128 | The key which is used for signing downlink management messages. |
| HMAC_PN_SZD, CMAC_PN_SZD, HMAC_PN_RLD, CMAC_PN_RLD | 32 | Used to avoid downlink replay attack on the management connection-when this expires a new security zone key shall be distributed by the base station. |

Figure 9:
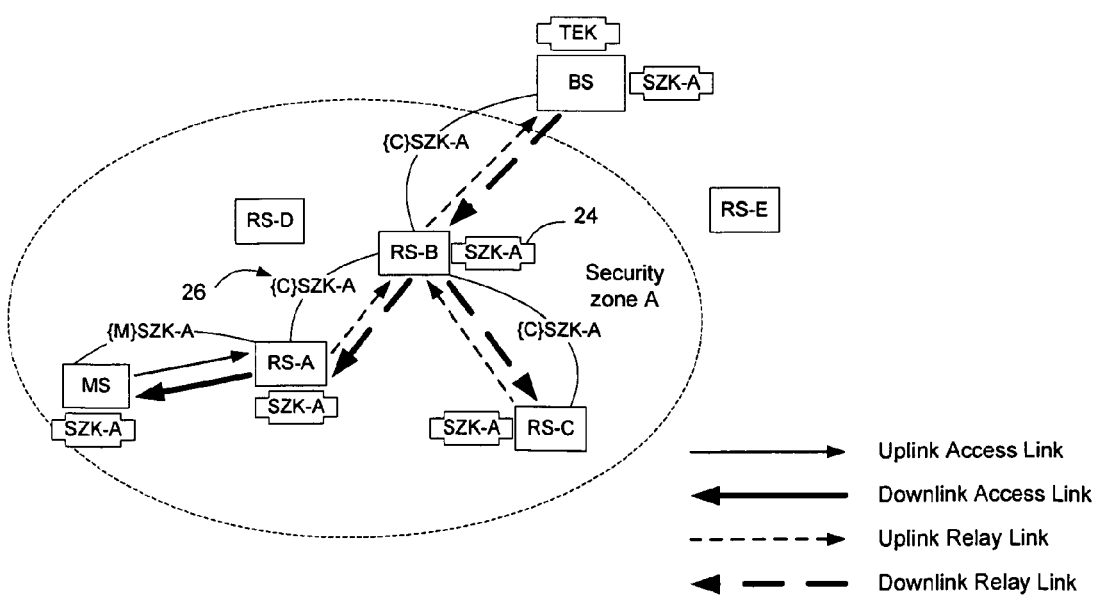
FIGS. 9 and 10 are functional block diagrams of a portion of the multi-hop relay wireless network of FIG. 8 and showing the creation of security associations between nodes in the multi-hop relay wireless network according to embodiments of the invention.
Figure 10:
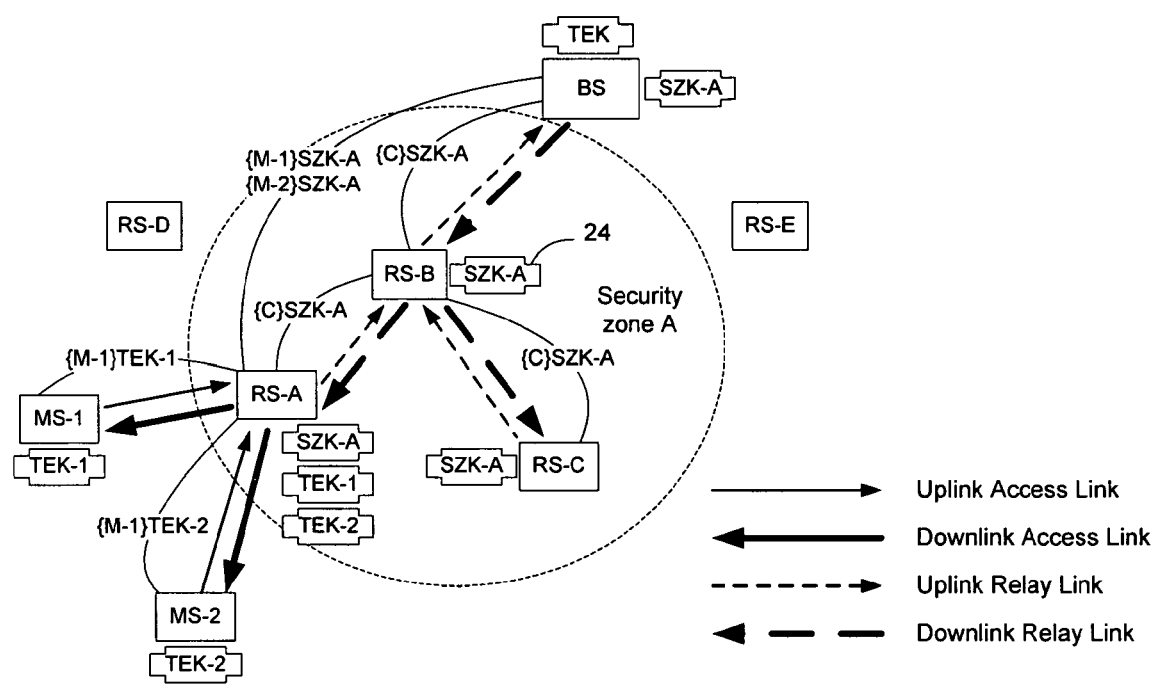

The security zone key may be generated by the base station using the base station's random number generator. The security zone key is used to either encrypt the MAC layer management messages or, at a minimum, to implement a HMAC/CMAC function to authenticate the message. The security zone key is used to authenticate and optionally encrypt MAC management messages to protect the confidentiality and integrity of the transmission of the MAC management messages among a group of relay stations and the base station within a security zone.

Where the security zone key is used to transmit data within the security zone, the security zone key may be used to encrypt the data for transmission within the zone. If the security zone includes the mobile stations, as shown in FIG. 9, the security zone key may be used end-to-end between the mobile station and base station to encrypt data messages flowing between the base station and mobile station. This has the advantage in that the base station and mobile station are only required to have a single security association. However, all mobile stations within the security zone may then have access to the data messages. By selectively including mobile stations in particular security zones, it is possible to create a layer 2 Virtual Private Network between the mobile stations and the base station, which also includes the relay stations and provides for both management and data messages to be secured using the same security zone encryption key.

Where the security zone does not include mobile stations, as shown in FIG. 10, the security zone key may be used to encrypt data messages if the base station is utilizing a distributed traffic key management process. In this case, where a distributed key management process is being used, the relay station may be provided with key material to be used to form security associations with mobile stations on the access links.

In FIG. 10, relay station A (RS-A) has been provided with TEK-1 for use with mobile station—(MS-1), and has been provided with TEK-2 for use with MS-2. Data messages intended for transmission by the base station to both mobile station 1 and mobile station 2 are encrypted with the security zone key and transmitted over the security zone from the base station to the relay stations. Relay station A will decode the data messages and re-encrypt the data messages with the TEK for each of the mobile stations to transmit the data messages to the correct mobile station. In the uplink direction, the relay station (RS-A) will receive data messages from MS1 encrypted using TEK-1 and will receive data messages from MS2 encrypted using TEK-2. The relay station (RS-A) will decrypt the data messages from each of the mobile stations and re-encrypt the messages using the security zone key. The relay station will then forward the messages toward the base station.

By decrypting the data messages received from the mobile stations, the relay station may combine messages from multiple mobile stations into a given protocol data unit (PDU) for transmission over the multi-hop wireless relay network. Similarly, in the downlink direction, the base station may combine messages for multiple mobile stations into a larger data message that is then forwarded on the relay network. The relay nodes will decrypt the larger message and extract data for their mobile stations, and then encrypt the data that they are responsible for while continuing to forward the larger protocol data unit on the network.

In order to securely distribute the Security Zone Key (SZK) to the RSs within one particular security zone, the base station would use a security handshake to protect from replay attacks and interception attacks. Preferably, a three-way handshake procedure such as the procedure specified in PKMv2 could be used for this purpose.

Figure 4:
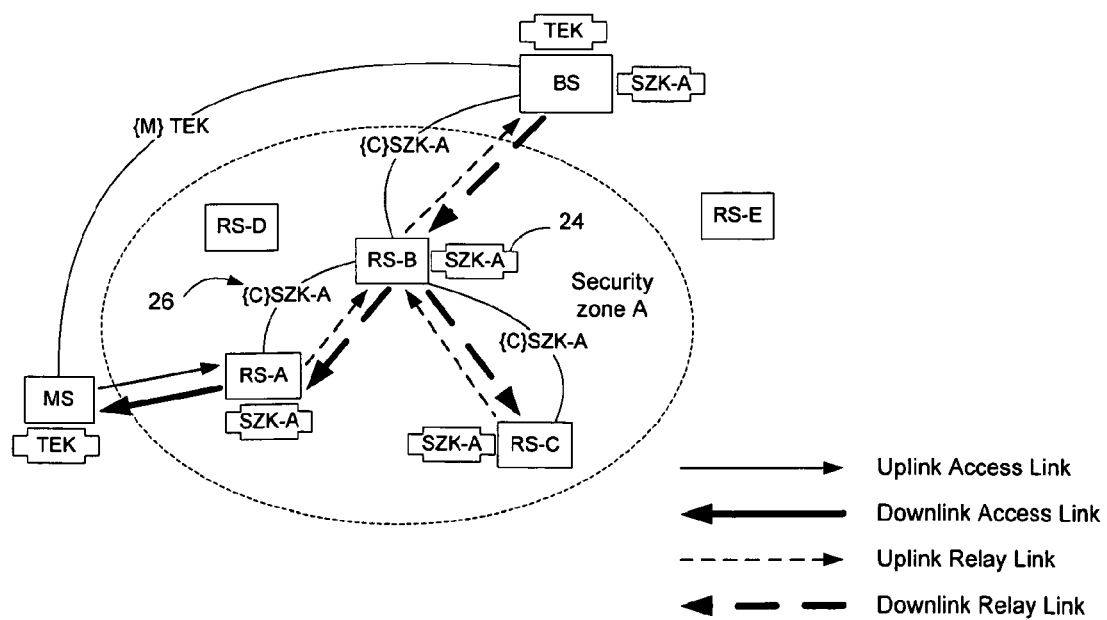
FIG. 4 is a functional block diagram of a portion of the multi-hop relay wireless network of FIG. 3 and showing the creation of security associations between nodes in the multi-hop relay wireless network according to an embodiment of the invention.

FIG. 4 shows a functional block diagram of a portion of the multi-hop relay wireless network of FIG. 3. FIG. 4 also shows the creation of security associations between nodes in the multi-hop relay wireless network according to an embodiment of the invention. As shown in FIG. 4 the base station in this example has established a security zone including relay station A (RS-A), relay station B (RS-B), and relay station C (RS-C). The base station has established a security zone key (SZK-A) 24 to be used in connection with the transmission of MAC management messages between relay stations in the security zone, and has transmitted the Security Zone Key (SZK-A) 24 to all of the relay stations within the security zone.

Relay stations that are not included in the security zone, such as relay station D (RS-D) and relay station E (RS-E) are not provided with a copy of the security zone key. The relay stations that are not included in the security zone may be located geographically close to the other relay stations in the security zone, such as RS-D, or may be geographically separated such as RS-E. Selection of relay stations for inclusion in the security zone is the province of the base station.

In operation, control messages {C} 26 will be signed or encrypted using the security zone key. This is indicated in FIG. 4 using the notation {C} SZK-A, which indicates that message C has been encrypted or signed using the security zone key SZK-A.

In the embodiment shown in FIG. 4 the security zone has been created for transmission of management messages and does not affect traffic between the mobile station and the base station. Specifically, the base station may establish a security association with the mobile station in a normal manner. As part of this security association, the base station will distribute a Traffic Encryption Key (TEK) to the mobile station. The TEK will then be used to sign and/or encrypt messages M transmitted between the mobile station and base station in both the uplink and downlink directions. Accordingly, the security zone key is only used, in one embodiment, for protecting and authenticating management MAC messages between the relay stations and between the relay stations and base station; it does not affect the mobile stations.

As described above in connection with FIGS. 9 and 10, depending on the manner in which the base station manages keys, and whether the mobile stations are allowed to be part of the security zone, the particular manner that data traffic is encrypted for transmission to the mobile stations may be adjusted as well. For example, where the security zone includes the mobile station, the security zone key may be used to encrypt data intended for the mobile station. Similarly, where the security zone does not include the mobile station but the base station uses distributed key management, the security zone key may be used to encrypt data for transmission over the security zone, while the traffic encryption key is used to encrypt data between the relay station and the mobile station on the access links. Thus, many combinations are possible.

Figure 5:
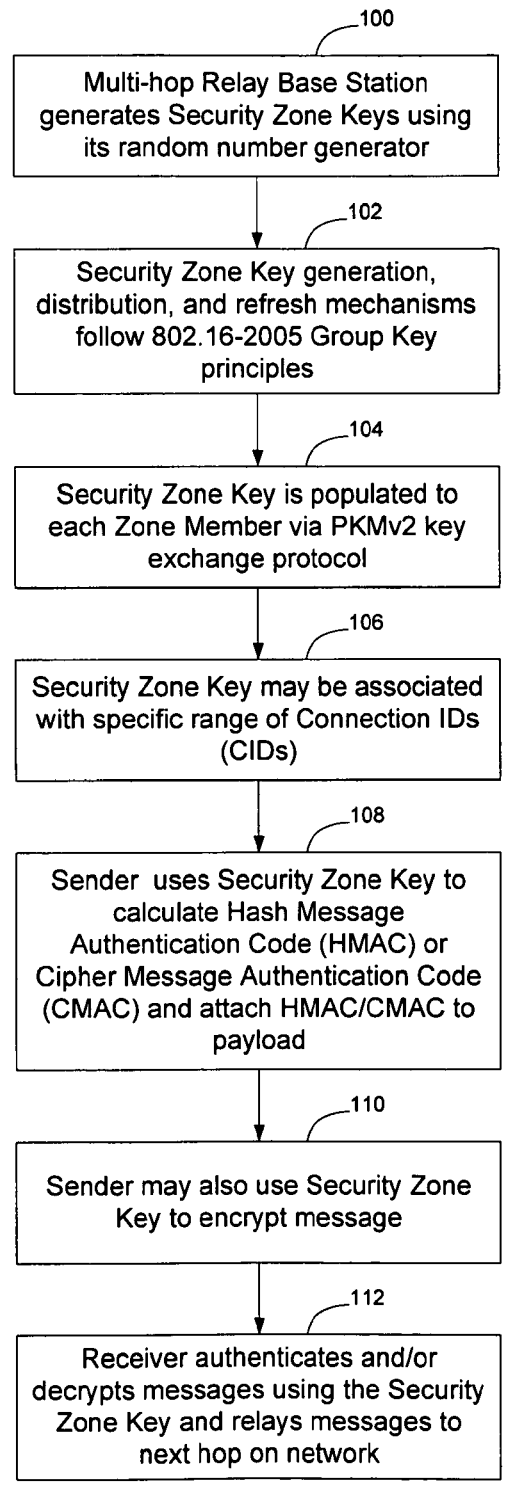
FIG. 5 is a flow chart illustrating a process of establishing one or more security zones in a multi-hop relay wireless network according to an embodiment of the invention.

FIG. 5 shows a flow chart of a process of establishing one or more security zones in a multi-hop relay wireless network according to an embodiment of the invention. As shown in FIG. 5, the multi-hop relay base station generates security zone keys (100) using its random number generator. Alternatively, the base station may use another process to generate the security zone key or obtain the security zone key, and the invention is not limited to an embodiment in which the base station uses its random number generator to generate the security zone key. The security zone key generation, distribution, and refresh mechanisms may follow the group key principles set forth in IEEE 802.16-2005, the content of which is hereby incorporated herein by reference.

The base station will then populate the security zone key to each zone member, such as relay station and mobile station, identified by the base station as belonging to the security zone (104). A process such as PKMv2 may be used as the key exchange protocol to ensure that the zone members receive the correct key and that the security zone key cannot be intercepted.

WiMax is a connection-oriented network, in which connections are established on the network and Connection IDs (CDs) are assigned to the connections. Optionally, the security zone key may be associated with particular CIDs (106) so that particular security zones may be created for particular connections or ranges of connections. Upon received security key, each zone member would store the key and create an association among the key, zone members, the relay topology, the air interfaces and the radio resources, and the assigned connections.

Conceptually, the attachment of the mobile station, together with the extent of the associated security zone and the allocated connections, would form a layer 2 VPN on the wireless relay network, in which the management messages (and the payload) associated with a particular subscriber could be protected and remain secret (encrypted) relative to other subscribers on the wireless network. This VPN partitioning wireless network topology and radio sources into disjoint zones and only allow the VPN members to share the designated wireless resources with the given security.

In WiMAX, CD allocation is based on capacity instead of subscriber separation. Different traffic, i.e. management traffic, and data traffic, may traverse over different CIDs. There are basic CID, primary management CD, secondary management CID, and other CIDs are dynamically allocated for data traffic. Where the security zone includes only the base station and relay stations, and does not include the mobile stations, assignment of CIDs to management traffic may be implemented in a normal manner. Optionally, in this instance, each security zone may be assigned a different management CID so that relay traffic for the different security zones may be determined quickly and so that different security zone keys may be selected to be used to process management messages associated with the different security zones. Where the security zones also include mobile stations, one or more CDs may be assigned to a particular security zone for use in connection with transmission of data traffic for the subscribers of that security zone. In this way, L2VPNs may be implemented for particular subscribers over the wireless relay network, while enabling the CD to serve as a VPN identifier on the network.

Once the security zone has been established, and the security zone key has been populated to each of the relay stations that have been designated as part of the security zone, the security zone key may be used in connection with messages that are to be transmitted within the security zone. For example, the sender of a message such as a data message or management message may use the security zone key to calculate a hash message authentication code (HMAC) for the message and/or cipher message authentication code (CMAC) for the message (108). The authentication code will be attached to the message and used by other relay stations and the base station to verify the authenticity of the message. Optionally, the sender of the management message may also encrypt the message using the security zone key before transmitting the message on the network (110).

When a message is received by a relay station or the base station, the zone member will decrypt the message using the security zone key. Where the message is not encrypted, the zone member that received the message may use the security zone key to check the HMAC/CMAC to verify the authenticity of the message. If the message is authentic, the zone member will perform the management functions associated with the message (if the message is a management message) and forward the messages to the other zone members in the security zone (112) based on the association established in previous step.

Where a relay station or base station is associated with more than one security zone, the relay/base station may also first determine an identity of the security zone associated with the message. For example, a range of connection IDs (CIDs) may be used to identify flows of messages within the multi-hop relay wireless network, and a particular connection ID may be assigned to each security zone on the wireless network. The relay station/base station may then read the connection ID associated with the message to determine the identity of the security zone. Based on the identity of the security zone, the relay/base station may select one of the several security zone keys and use that key to decrypt/authenticate the management message before forwarding it on over the relay network. CIDs may be allocated, as described above, for transmission of management messages and/or data messages within a security zone.

Figure 6:
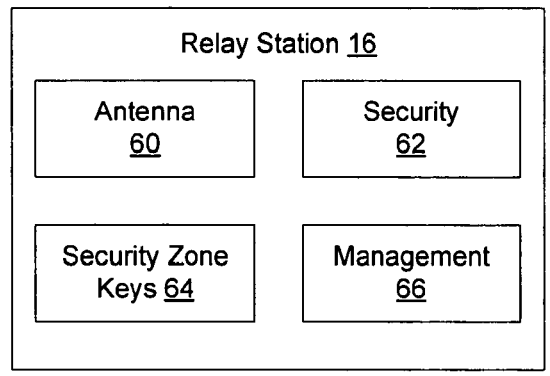
FIG. 6 is a functional block diagram of an example relay station for use on a multi-hop relay wireless network.

FIG. 6 shows a functional block diagram of an example relay station. In the example relay station shown in FIG. 6, the relay station includes one or more antennas 60 to transmit and receive data on the multi-hop relay wireless network. The relay station also includes one or more hardware or software modules designed to enable operation of the relay station to be modified to implement the functions described in greater detail above, such as by enabling the relay station to participate in one or more security zones on the wireless network.

In one embodiment, the relay station includes a security system 62 designed to participate in key exchanges with the base station and otherwise perform the security aspects described herein. Once a relay station has become associated with a security zone, it will retain a copy of a security zone key 64 and associated key context to be used in connection with the transmission of management messages associated with a management system 66, and optionally data messages, on the multi-hop relay wireless network. The relay station may include other systems as well to enable it to operate on the multi-hop relay wireless network. Where the relay station implements security associations with the mobile stations, the relay stations will also include traffic encryption keys for those security associations.

Figure 7:
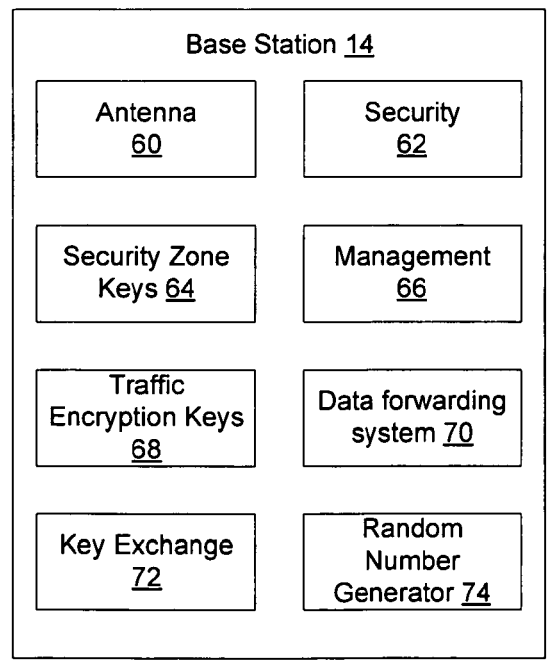
FIG. 7 is a functional block diagram of an example base station for use on a multi-hop relay wireless network.

FIG. 7 shows an example of a base station that may be used on a multi-hop relay wireless network. The base station is configured similar to the relay station, except that the base station is also intended to establish security associations with mobile stations and handle transmission of data between the mobile stations and backbone. Accordingly, in addition to a security system 62, security zone keys 64, and management system 66, the base station may be expected to have copies of one or more Traffic Encryption Keys (TEKs) 68 to enable it to maintain security associations with the mobile stations. A forwarding system 70 may be provided to enable the base station to route traffic between the backbone and the mobile stations. Additionally, the base station may include additional software such as key exchange software 72 to initiate transmission of keys to relay stations and a random number generator 74 that may be used to generate the security zone keys as described above. The base station may include other systems as well to enable it to operate as a base station on the multi-hop relay wireless network.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

The control logic may be implemented as a set of program instructions that are stored in a computer readable memory and executed on a microprocessor. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense.

What is claimed is:

1. A method of implementing security zones on a multi-hop relay wireless network, the method comprising:
   a mobile station establishing a transport security association with a first relay station for use in transmission of data between the first relay station and the mobile station, wherein a security zone is established by creating a security association among at least a base station and at least two relay stations, including the first relay station, on the multi-hop relay wireless network, wherein the security association enables security zone members to exchange data and management messages in a secure manner on the multi-hop wireless network, wherein the transport security association between the mobile station and the first relay station is different than the security association between the security zone members;
   the mobile station receiving a first message from the first relay station, wherein the first message is encrypted according to transport key material associated with the transport security association, and wherein, prior to transmission of the first message to the mobile station, the first relay station received the first message, encrypted according to security zone key material associated with the security zone, decrypted the first message, and encrypted the first message using the transport key material;
   the mobile station decrypting the first message using the transport key material.

2. The method of claim 1, further comprising:
   the mobile station encrypting a second message using the transport key material; and
   the mobile station transmitting the second message to the first relay station.

3. The method of claim 2, wherein, in response to receiving the second message, the first relay station is configured to:
   decrypt the second message using the transport key material;
   encrypt the second message using the security zone key material; and
   transmit the second message.

4. The method of claim 1, wherein a plurality of security zones are established in the multi-hop wireless network, each security zone comprising the base station and a plurality of relay stations.

5. The method of claim 1, wherein one or more connection identifiers are assigned to the security zone.

6. A mobile station, comprising:
   wireless communication circuitry for performing wireless communication; and
   processing hardware coupled to the wireless communication circuitry, wherein the processing hardware is configured to:
      establish a transport security association with a first relay station for use in transmission of data between the first relay station and the mobile station, wherein a security zone is established by creating a security association among at least a base station and at least two relay stations, including the first relay station, wherein the security association enables security zone members to exchange data and management messages in a secure manner on the multi-hop wireless network, wherein the transport security association between the mobile station and the first relay station is different than the security association between the security zone members;
      receive a first message from the first relay station, wherein the first message is encrypted according to transport key material associated with the transport security association, and wherein, prior to transmission of the first message to the mobile station, the first relay station received the first message, encrypted according to security zone key material associated with the security zone, decrypted the first message, and encrypted the first message using the transport key material;
      decrypt the first message using the transport key material.

7. The mobile station of claim 6, wherein the processing hardware is further configured to:
   encrypt a second message using the transport key material; and
   transmit the second message to the first relay station.

8. The mobile station of claim 7, wherein, in response to receiving the second message, the first relay station is configured to:
   decrypt the second message using the transport key material;
   encrypt the second message using the security zone key material; and
   transmit the second message.

9. The mobile station of claim 7, wherein a plurality of security zones are established in the multi-hop wireless network, each security zone comprising the base station and a plurality of relay stations.

10. The mobile station of claim 7, wherein one or more connection identifiers are assigned to the security zone.

11. A non-transitory, computer accessible memory medium storing program instructions executable by one or more processors to:
   establish a transport security association with a first relay station for use in transmission of data between the first relay station and the mobile station, wherein a security zone is established by creating a security association among at least a base station and at least two relay stations, including the first relay station, wherein the security association enables security zone members to exchange data and management messages in a secure manner on the multi-hop wireless network, wherein the transport security association between the mobile station and the first relay station is different than the security association between the security zone members;
   receive a first message from the first relay station, wherein the first message is encrypted according to transport key material associated with the transport security association, and wherein, prior to transmission of the first message to the mobile station, the first relay station received the first message, encrypted according to security zone key material associated with the security zone, decrypted the first message, and encrypted the first message using the transport key material;
   decrypt the first message using the transport key material.

12. The non-transitory, computer accessible memory medium of claim 11, wherein the program instructions are further executable to:
   encrypt a second message using the transport key material; and
   transmit the second message to the first relay station.

13. The non-transitory, computer accessible memory medium of claim 12, wherein, in response to receiving the second message, the first relay station is configured to:
   decrypt the second message using the transport key material;
   encrypt the second message using the security zone key material; and
   transmit the second message.

14. The non-transitory, computer accessible memory medium of claim 11, wherein a plurality of security zones are established in the multi-hop wireless network, each security zone comprising the base station and a plurality of relay stations.

15. The non-transitory, computer accessible memory medium of claim 11, wherein one or more connection identifiers are assigned to the security zone.

\* \* \* \* \*